United States Patent
Conaway

(10) Patent No.: US 6,251,290 B1
(45) Date of Patent: Jun. 26, 2001

(54) METHOD FOR RECOVERING HYDROCARBONS FROM TAR SANDS AND OIL SHALES

(75) Inventor: Lawrence M. Conaway, Niagara Falls, NY (US)

(73) Assignee: Continuum Environmental, Inc., Niagara Falls, NY (US)

( * ) Notice: Subject to any disclaimer, the term of this patent is extended or adjusted under 35 U.S.C. 154(b) by 0 days.

(21) Appl. No.: 09/451,293

(22) Filed: Nov. 30, 1999

Related U.S. Application Data

(63) Continuation-in-part of application No. 09/304,377, filed on May 4, 1999, now Pat. No. 6,096,227, which is a continuation-in-part of application No. 08/971,514, filed on Nov. 17, 1997, now Pat. No. 5,928,522, which is a continuation-in-part of application No. 08/807,643, filed on Feb. 27, 1997, now Pat. No. 5,797,701.

(51) Int. Cl.$^7$ .................. C02F 1/72; B09C 1/08
(52) U.S. Cl. ............... 210/759; 210/766; 210/768; 210/774; 405/128; 588/205
(58) Field of Search .................. 210/758, 759, 210/766, 768, 774, 908, 909; 405/128; 588/205

(56) References Cited

U.S. PATENT DOCUMENTS 4,416,786 * 11/1983 Knorre et al. .................. 210/759
5,259,962 * 11/1993 Later ........................... 210/758

FOREIGN PATENT DOCUMENTS

95/30627 * 11/1995 (WO).

* cited by examiner

Primary Examiner—David A. Reifsnyder
(74) Attorney, Agent, or Firm—Harris Beach LLP

(57) ABSTRACT

A method for treating hydrocarbonaceous deposits to recover a petroleum-like hydrocarbon portion and a cleaned particulate substrate portion. Hydrocarbonaceous ore containing bitumen and/or kerogen is crushed or otherwise comminuted to the particle size of sand or smaller. The comminuted ore is mixed with water to form a slurry, is heated to between 60° C. and 100° C., and is blended with an oxidant in aqueous solution, preferably hydrogen peroxide. Both free interstitial hydrocarbons and those hydrocarbons bound electrostatically to the surfaces of clay-like particles in the ore are released from the rock substrate in a putative electrophysical reaction in the presence of the oxidant. Some of the released bituminous and kerogenic compounds are then controllably cleaved by the oxidant in a limited Fenton's reaction to yield organic compounds having lower average molecular weights which are suitable for refining as oil after separation from the process water phase and the residual rock substrate. The water and rock tailings from the process are substantially free of hydrocarbon contamination and are environmentally suitable for landfill disposal.

18 Claims, 1 Drawing Sheet

METHOD FOR RECOVERING HYDROCARBONS FROM TAR SANDS AND OIL SHALES

Figure 1:
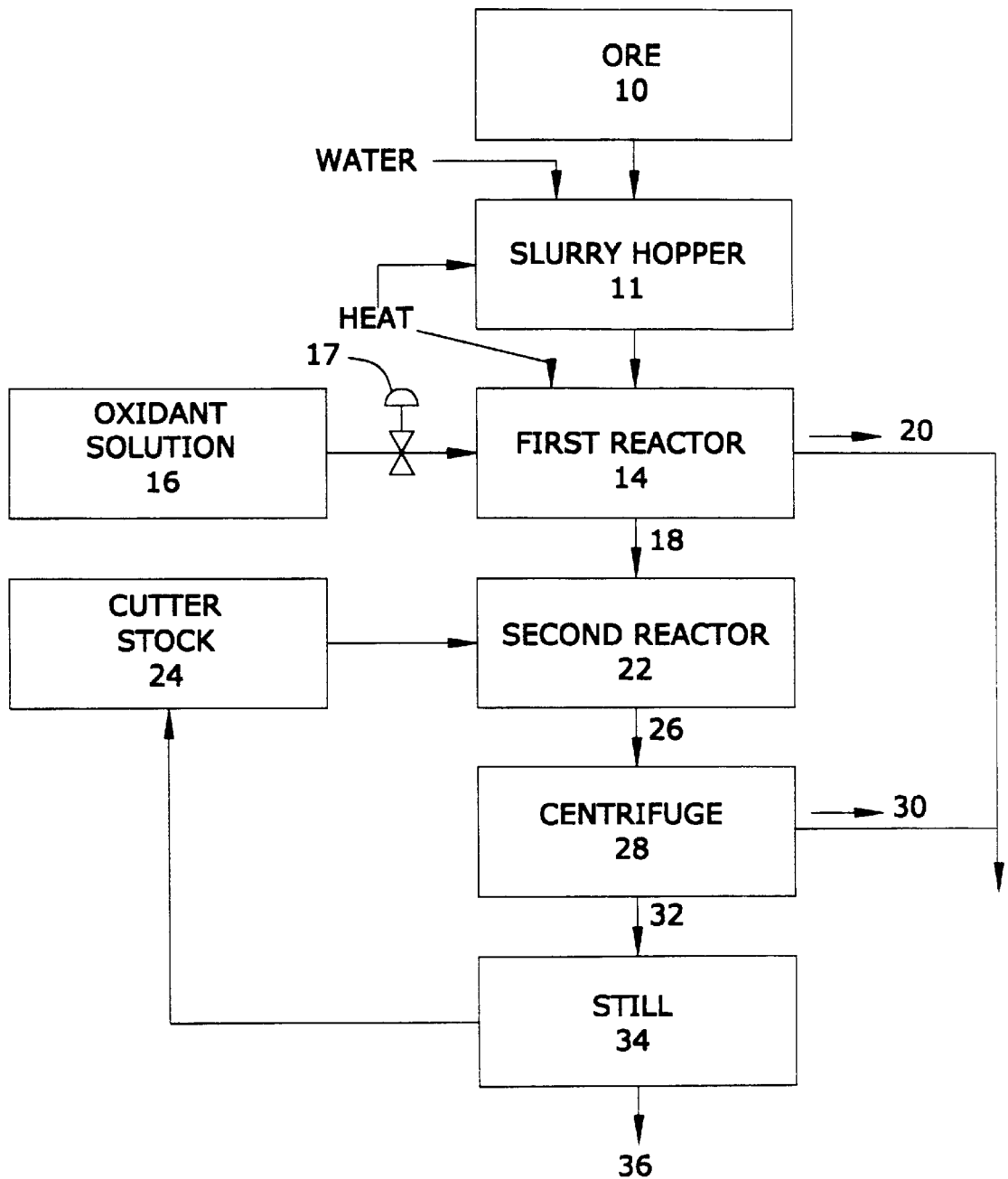

The present application is a Continuation-In-Part of my application Ser. No. 09/304,377 filed May 4, 1999, now matured as U.S. Pat. No. 6,096,227, which is a Continuation-In-Part of my application Ser. No. 08/971,514 filed Nov. 17, 1997, now matured as U.S. Pat. No. 5,928,522 issued Jul. 27, 1990, which is a Continuation-In-Part of my application Ser. No. 08/807,643 filed Feb. 27, 1997, now matured as U.S. Pat. No. 5,797,701 issued Aug. 25, 1998.

DESCRIPTION

The present invention relates to methods for recovering petroleum-like hydrocarbons from hydrocarbon-containing geological reservoirs, and more particularly to a method for processing hydrocarbon-containing geologic material, including tar sands, oil sands, oil sandstones, and oil shales, to recover petroleum-like hydrocarbons, and especially crude oil, therefrom and to render the rock substrate residues suitable for environmentally-acceptable disposal.

As used herein, hydrocarbonaceous deposit is to be taken to include tar sands, oil sands, oil sandstones, oil shales, and all other naturally-occurring geologic materials having hydrocarbons contained within a generally porous rock-like inorganic matrix.

Tar sands are naturally-occurring geological formations found in, for example, Canada (Alberta). Such sands have potential for yielding large amounts of petroleum. Tar sands are porous sands generally containing substantial amounts of clay and filled with heavy, relatively solid asphaltic hydrocarbons. Most of these tar-like bitumenous materials are residues remaining in reservoir rocks after lighter (lower molecular weight) crude oils have escaped. The largest of the world's tar sand deposits occur in northern Alberta along the Athabaska River. Tar sand layers in this area may be more than 60 meters thick and lie near the surface over a total area of about 50,000 km. They are estimated to contain a potential yield in excess of 1.6 trillion barrels of oil.

Oil shales are related to oil sands and tar sands; however, the substrate is a fine-grained laminated sedimentary rock containing an oil-yielding class of organic compounds known as kerogen. Oil shale occurs in many places around the world. Particularly kerogen-rich shales occur in the United States, in Wyoming, Colorado, and Utah, and are estimated to contain in excess of 540 billion potential barrels of oil.

In the known art of petroleum recovery from hydrocarbonaceous deposits, the high molecular weight asphaltic or kerogenic material may be driven out of the sands, sandstones, or shales with heat. For example, in a known process for recovering kerogen from oil shale, crushed shale is heated to about 480° C. to distill off the kerogen which is then hydrogenated to yield a substance closely resembling crude oil. Such a process is highly energy intensive, requiring a portion of the process output to be used for firing the retort, and thus is relatively inefficient. Also, a significant percentage of the kerogen may not be recovered, leaving the process tailings undesirable for landfill.

Other known processes, for recovering bitumen from tar sands for example, may require the use of caustic hot water or steam. For example, a process currently in use in Canada requires that a hot aqueous slurry of tar sand be mixed with high concentrations of aqueous caustic soda to fractionate the bitumen into lower molecular weight hydrocarbons which may then be separated from the inorganic rock residues and refined further like crude oil. This process has several serious shortcomings. First, it is relatively inefficient, recovering less than about 70% of the hydrocarbons contained in the sands. "Free" hydrocarbons, that is, compounds mechanically or physically contained interstitially in the rock, may be recovered by this process; but "bound" hydrocarbons, that is, compounds electrostatically bound by non-valence charges to the surface of clays or other fines having high electronegative surface energy, are not readily released by the prior art process. In fact, high levels of caustic may actually act to inhibit the desired release of organic compounds from such surfaces. Thus, the prior art process is wasteful in failing to recover a substantial portion of the hydrocarbon potential, and the substrate residue of the process may contain substantial residual hydrocarbon, making it environmentally unacceptable for landfill.

Second, both the aqueous residual and the sand/clay residue are highly caustic and may not be spread on the land or impounded in lagoons without extensive and expensive neutralization.

Third, the caustic aqueous residual may contain high levels of dissolved petroleum, which is non-recoverable and also toxic in landfill. Such residual also has a high Chemical Oxygen Demand (COD), making such residual substantially anoxic and incapable of supporting plant or animal life.

Fourth, oils recovered by the prior art process typically have high levels of entrained or suspended fine particulates which must be separated as by gravitational settling, filtration, or centrifugation before the oils may be presented for refining.

Fifth, because of relatively long settling times required for separation of solid particulates from the aqueous medium and the recoverable hydrocarbons, which typical are highly and stably emulsified as a colloidal suspension, the prior art process is not generally amendable to a continuous-feed operation.

Sixth, the present-day cost of oil recovered from Albertan tar sands by a prior art process requires a substantial Governmental subsidy to match the world spot price of crude oil.

It is a principal object of the invention to provide an improved process for recovering hydrocarbons from hydrocarbonaceous deposits in greater than 90% yield.

It is a further object of the invention to provide an improved process for recovering hydrocarbons from hydrocarbonaceous deposits in greater than 99% yield.

It is a still further object of the invention to provide an improved recovery process which provides a substrate residue which is acceptable under applicable guidelines for landfill disposal.

It is a still further object of the invention to provide an improved recovery process which can recover both free and bound hydrocarbon compounds from geologic substrates and thereby recover a high percentage of all of the hydrocarbons therein.

It is a still further object of the invention to provide an improved recovery process which is substantially less expensive to operate on a per-unit of ore basis than are known treatment processes.

It is a still further object of the invention to provide an improved recovery process which can yield oil at a unit cost competitive with that of well-produced crude oil.

Briefly described, hydrocarbonaceous ore containing bitumen and/or kerogen is crushed or otherwise comminuted to the consistency of sand. The comminuted ore is mixed with water to form a slurry, is heated to between about 60° C. and about 100° C., and is blended with an oxidant in aqueous solution, preferably hydrogen peroxide. Both free interstitial hydrocarbons and those hydrocarbons bound electrostatically to the surfaces of clay-like particles are released from the rock substrate, possibly by an electrophysical reaction in the presence of the oxidant. A portion of the released bitumenous and kerogenic compounds are then cleaved by the oxidant in a controlled Fenton's reaction to yield organic compounds having lower molecular weights which are suitable for refining as oil after separation from the process water phase and the residual rock substrate. The water and rock tailings from the process are substantially free of hydrocarbon contamination and are environmentally suitable for disposal.

The foregoing and other objects, features, and advantages of the invention, as well as presently preferred embodiments thereof, will become more apparent from a reading of the following description in connection with the accompanying drawing, in which FIG. 1 is a schematic flowpath of a semi-continuous process for recovering hydrocarbons from hydrocarbonaceous ores in accordance with the invention. Since ore volumes to be treated can be relatively large, it may be preferable to configure the process for continuous throughput, although semi-continuous (as shown in FIG. 1) and batch systems are within the scope of the invention and all such processes may be configured of conventional apparatus without undue experimentation or further invention.

I have found that my oxidative stripping processes, for remediation of hydrocarbon-contaminated soils as disclosed in my U.S. Pat. No. 5,797,701, and for treatment of oil refinery wastes as disclosed in my U.S. Pat. No. 5,928,522, and for treatment of industrial sludges as disclosed in my U.S. Pat. No. 6,096,227, are readily adaptable as described herein to the treatment of hydrocarbonaceous gelogic deposits such as tar sands, oil sands, oil sandstones, oil shales, and the like, to recover a high percentage of the hydrocarbon content therefrom. The relevant disclosures of U.S. Pat. Nos. 5,797,701 and 5,928,522 are hereby incorporated by reference.

Referring to FIG. 1, in a hydrocarbon recovery process embodying the invention, hydrocarbonaceous ore 10, which has been mined, crushed, ground, screened, or otherwise pre-treated to eliminate large rocks and debris and to yield a feedstock having particles preferably less than about 2 mm in diameter (sand size), is mixed with water in a slurry hopper 11 to form a pumpable slurry 12 having a weight percent proportion of ore to water of between about 2:1 and about 1:1. The slurry is conditioned by agitation and heating to a temperature between about 50° C. and about 80° C. to release free hydrocarbons, melt waxy hydrocarbon solids, reduce the viscosity of the batch, reduce the density of hydrocarbon fractions within the batch, and begin to break surface adhesion of hydrocarbon compounds bound to substrate surfaces. The free hydrocarbons thus released define a first hydrocarbon residue.

In a reactor vessel 14, slurry 12 is heated to a temperature between about 60° C. and about 100° C. and is blended with an aqueous solution 16 containing an oxidizing reagent to produce a slurry having a level of oxidant equivalent to a hydrogen peroxide percentage between about 0.1% and about 10.0% in the water phase by weight. Various well known oxidants, for example, potassium permanganate and sodium peroxide, can perform the oxidative function of the subject process, but hydrogen peroxide is the preferred oxidant because it ultimately decomposes to water and oxygen, leaving no elemental or mineral residue in the tailings.

In the presence of a hot oxidant, the electrostatically bound hydrocarbons are released from the surface of substrate particles, especially very fine clay or clay-like particles, the bound hydrocarbons thus released defining a second hydrocarbon residue.

Although the accuracy of a theory is not relied upon for patentability of the methods disclosed and claimed herein, it is currently believed by the inventor that the hydrocarbon molecules adhered to the rock substrate particles in the ore carry positive non-valence charges which bind them to negative surface charges on the particles, especially on clay-sized fines; and further, that the hot oxidant, in a mechanism not yet fully understood, tends to neutralize the non-valence charges on either or both of the hydrocarbon molecules and the particle surfaces, thereby releasing one from the other.

The hot oxidant functions further in a second way to oxidize allyl and other hydrocarbon moieties to lighter petroleum fractions via the well-known Fenton's reaction. Hydrogen peroxide reacts with ubiquitous ferrous ions to produce an hydroxyl radical in an acidified aqueous medium.

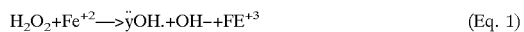
$$H_2O_2 + Fe^{+2} \longrightarrow \ddot{y}OH \cdot + OH^- + FE^{+3} \qquad (Eq. 1)$$

The resultant hydroxyl free radicals (OH) are extremely powerful oxidizers that progressively react with organic compounds through a series of oxidation reactions. During the process, the oxidation reactions proceed by degrading the organic constituents (b) having long chain lengths (n carbon atoms) into a greater number of molecules (b+c) having less complex and shorter carbon chain lengths (n−α):

$$H_2O_2 + bC_nH_n \longrightarrow H_2O + (b+c)C_{n-\alpha}H_n \qquad (Eq. 2)$$

In an excess of oxidant, all organic carbon may be converted to $CO_2$ in accordance with Eq. 3 (not balanced):

$$H_2O_2 + C_nH_n \rightarrow H_2O + nCO_2 \qquad (Eq. 3)$$

However, in a process in accordance with the invention, wherein reaction time, temperature, and the amount of oxidant are controlled by a programmable controller 17, Fenton's reaction is limited to breaking relatively few covalent bonds, sufficient only to reduce the average molecular weight of the bituminous or kerogenic hydrocarbons in the first and second residues to approximately that of conventional crude oil produced from a well.

As the slurry is heated and agitated, the larger sand-sized particles, substantially freed of hydrocarbons, settle out of the slurry, and a froth 18 rich in first and second hydrocarbon residues rises to the surface as the aqueous and organic phases separate gravitationally. Froth 18 typically contains substantial amounts of entrained water and substrate fines. The first aqueous phase tailings 20, containing the clean sand substrate, may be drawn off from the bottom of the reaction vessel 14 and landfilled directly as desired. For process efficiency, froth 18 may be transferred to a second reactor 22, as shown in FIG. 1, permitting generation of the next batch in vessel 14 while froth 18 is being further processed (semi-continuous, or moving batch, process); or, all steps requiring a vessel may be carried out in a single reactor.

To remove water and fines from the organic phase, the froth containing oxidized and non-oxidized bitumen and/or kerogen is mixed, preferably at a ratio of 1:1, with a so-called "cutter stock" 24, typically either diesel oil or naphtha, to dilute and solubilize the bitumen or kerogen, causing a further separation of the froth into a second aqueous phase containing the fines and an organic phase containing the hydrocarbons. In some operations, this separation may be effected by discharging the blended froth 26 through a commercial centrifuge 28, from which the aqueous phase tailings 30 may be landfilled directly. Typically, the hydrocarbon content of the combined first and second tailings is less than about 1%, which meets the requirements for disposal in accordance with US government regulations.

The organic phase 32 may be subjected to distillation 34 to remove and recover for recycling the cutter stock 24. The partially-oxidized bitumen and/or kerogen 36, recovered from ore 10 by the subject process and free of the residual water and fine particulates which characterize hydrocarbon residues produced by the known art process, now may be sent for further processing such as to an oil refinery.

In practical applications of the subject process to recovery of bitumenous liquids from Athabaska tar sands, material approximating crude oil is recoverable at a lower cost per barrel than the world spot price for crude oil.

From the foregoing description it will be apparent that there has been provided an improved method for economically recovering petroleum-like hydrocarbon residues from hydrocarbonaceous geological deposits and for discharging a substrate residue environmentally suitable for landfill disposal. Variations and modifications of the herein described method, in accordance with the invention, will undoubtedly suggest themselves to those skilled in this art. Accordingly, the foregoing description should be taken as illustrative and not in a limiting sense.

What is claimed is:

1. A method for treating an aqueous slurry of hydrocarbonaceous ore containing hydrocarbon compounds and substrate solids to recover hydrocarbon residues therefrom, comprising the steps of:
   a) conditioning said slurry by heating to mobilize a first portion of said hydrocarbon residues;
   b) adding an amount of an oxidant to said slurry;
   c) releasing a second portion of said hydrocarbon residues from said substrate solids contained in said slurry in response to said oxidant;
   d) partially oxidizing at least part of at least one of said first and second hydrocarbon residue portions to yield partially oxidized hydrocarbon residues, said amount of oxidant being predetermined to be insufficient to completely oxidize said hydrocarbon residue portions; and
   e) separating a liquid effluent containing said partially oxidized hydrocarbon residues from said substrate solids.

2. A method in accordance with claim 1 wherein said slurry is heated to a temperature between about 60° C. and about 100° C.

3. A method in accordance with claim 1 wherein said oxidant is selected from the group consisting of hydrogen peroxide, sodium peroxide, and potassium permanganate.

4. A method in accordance with claim 1 wherein said oxidant is present in said slurry after said adding step in an amount between about 0.1 weight percent and about 10.0 weight percent relative to the weight of water in said slurry.

5. A method in accordance with claim 1 further comprising the step of adjusting the weight ratio of water to ore in said slurry to between about 1:1 and about 2:1 prior to said conditioning step.

6. A method in accordance with claim 1 wherein said liquid effluent contains water.

7. A method in accordance with claim 1 wherein said ore is selected from the group consisting of tars, tar sands, oil sands, oil shales, and oil sandstones.

8. A method in accordance with claim 7 wherein said ore includes clay-size particles.

9. A method in accordance with claim 8 wherein at least a part of said second portion of hydrocarbon residues is released from said clay-size particles.

10. A method in accordance with claim 1 wherein said method is carried out in a process selected from the group consisting of continuous, semi-continuous, batch, and combinations thereof.

11. A method in accordance with claim 1 wherein all of said steps are carried out in one vessel.

12. A method in accordance with claim 1 further comprising the steps of:
   a) mixing said liquid effluent with a cutter stock to dilute and solubilize said first and second hydrocarbon residue portions; and
   b) separating said diluted and solubilized residue portions from said substrate solids.

13. A method for treating an aqueous slurry of ore containing hydrocarbon residues and substrate solids to recover hydrocarbons therefrom, comprising the steps of:
   a) conditioning said slurry by heating to a temperature between about 60° C. and about 100° C. to mobilize first hydrocarbon residues;
   b) adding an amount of an oxidant to said slurry;
   c) releasing second hydrocarbon residues from said substrate solids contained in said slurry in response to said oxidant;
   d) partially oxidizing a portion of said first and second hydrocarbon residues to yield partially oxidized hydrocarbon residues, said amount of oxidant being predetermined to be insufficient to completely oxidize said hydrocarbon residue portions;
   e) separating a liquid effluent containing said first and second hydrocarbon residues and said partially oxidized hydrocarbon residues and a first portion of said substrate solids from a second portion of said substrate solids; and
   f) separating said first and second hydrocarbon residues and said partially oxidized hydrocarbon residues from said first portion of said substrate solids.

14. A method in accordance with claim 13 wherein said oxidant is hydrogen peroxide.

15. A method in accordance with claim 13 wherein at least one of said first and second hydrocarbon residues includes hydrocarbons selected from the group consisting of bitumen and kerogen.

16. A method in accordance with claim 13 wherein said first portion of said substrate solids includes clay-size particles.

17. A method in accordance with claim 13 wherein said step of separating said first and second hydrocarbon residues from said first portion of said substrate solids further comprises the steps of:
   a) mixing said liquid effluent with a cutter stock to dilute and solubilize said first and second hydrocarbon residues; and
   b) separating said diluted and solubilized residues from said substrate solids.

18. A method in accordance with claim 17 further comprising the step of separating said cutter stock from said hydrocarbon residues to yield said hydrocarbons.

\* \* \* \* \*